W. H. SAECK.
FOCUSING FINDER FOR CAMERAS.
APPLICATION FILED JUNE 2, 1921.

1,430,684.

Patented Oct. 3, 1922.

Witness:
Robert E. Weber

Inventor:
William H. Saeck
Young & Young
Attorneys

Patented Oct. 3, 1922.

1,430,684

UNITED STATES PATENT OFFICE.

WILLIAM H. SAECK, OF MADISON, WISCONSIN.

FOCUSING FINDER FOR CAMERAS.

Application filed June 2, 1921. Serial No. 474,425.

*To all whom it may concern:*

Be it known that I, WILLIAM H. SAECK, a citizen of the United States, and resident of Madison, in the county of Dane and State of Wisconsin, have invented certain new and useful Improvements in Focusing Finders for Cameras; and I do hereby declare that the following is a full, clear, and exact description thereof.

My invention relates to a new and useful improvement in focusing finders for cameras which are used in determining the proper focus for cameras.

With the usual plate camera it is necessary in order to determine the proper focal adjustment, to remove the plate holder and use a hood to determine the proper adjustment by viewing the image on the screen. This method is particularly objectionable in connection with film cameras owing to the impracticability of removing the film. For this reason extensible film cameras are usually provided with a gauge for indicating the proper adjustment for a given distance from the object to be photographed hence it is necessary to accurately judge the distance or to measure it in order to determine the proper adjustment to be made.

It is an object of my invention to provide a device which may be attached to any of the commercial types of cameras and by means of which the proper adjustment may be directly determined without removing the plate or film or otherwise interfering with the normal function of the camera.

It is a further object to provide an attachment including a small auxiliary lens of the same focal length as the camera lens and a screen on which a miniature image may be visualized in order to determine when the adjustment has been properly made.

It is a further object of the invention to provide a device which may be properly adjusted so as to adapt it for any size of camera.

With the above general objects in view, my invention comprises certain structural details which will be described in connection with the accompanying drawing, in which—

Figure 1:
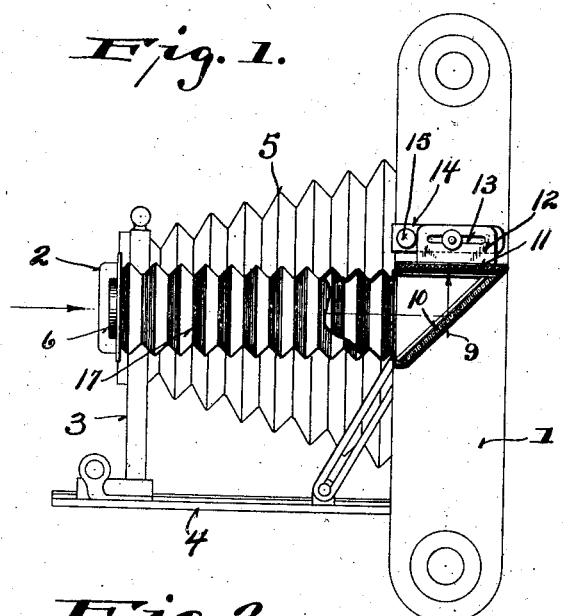
Figure 2:
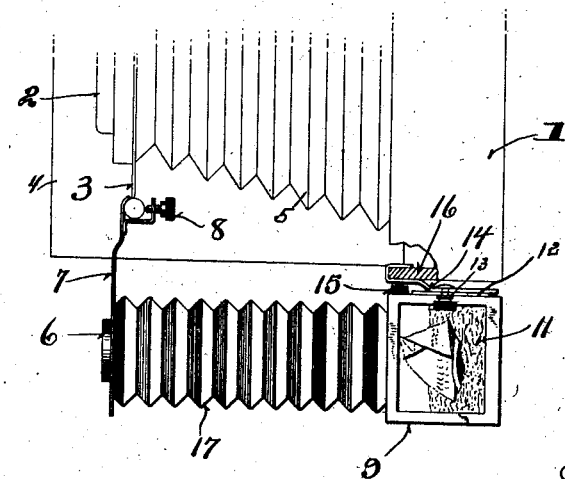

Figure 1 is a side elevation of my invention attached to a camera of the film type, a portion of the screen frame being broken away, and Figure 2 is a plan view of the same.

Referring more specifically to the drawing, numeral 1 indicates the outside casing of the camera which is provided with the usual lens and shutter 2 which is carried by a lens frame 3 slidably mounted in the guideway 4 which is pivotally connected to the camera casing. The usual bellows 5 extends from the lens to the casing. My attachment comprises a miniature lens 6, similar in shape to the camera lens and carried by an arm 7 which is attached to the lens frame 3 by means of a set screw, or the like, 8. The lens 6 is connected by the bellows 17 with the screen frame 9, in which is mounted a reflector or mirror 10 in an inclined position so as to reflect upwardly the rays coming from the lens. At the upper side of the frame 9, is a horizontally disposed screen 11. The frame 9 is provided with a flange 12 which is adjustably attached by means of the screw and slot 13 to the bracket 14. This bracket may be attached by means of the set screw 15 to the side 16 of the camera casing.

It will be understood that the frame 9 may be longitudinally adjusted by means of the screw and slot 13 so that the image viewed on the screen 11 will be of the same character as the image projected upon the camera plate. The operator may then view upon the screen 11 the image of the object to be photographed and may determine accurately when he has secured the proper focal adjustment. It will also be seen that my invention may be quickly attached to any of the commercial types of cameras, and will obviate any guess work as to the range or any inconvenience of removing the plate holder or film.

I claim as my invention:

An attachment for cameras comprising a diminutive lens, a frame in which the lens is mounted, means for attaching the frame to the shutter frame of camera with said lens in the same plane as the camera lens, a bracket adapted to be secured to the camera casing, a screen frame having a screen mounted in one side thereof, means for attaching the screen frame to said bracket with the screen in horizontal position, a bellows connecting the lens frame and screen frame, a reflector for reflecting upon the screen, rays which pass through the lens, and means for adjusting the screen frame longitudinally on said bracket so that the distance between the lens and screen will correspond with the distance between the lens and photographic element of the camera.

In testimony that I claim the foregoing I have hereunto set my hand at Madison, in the county of Dane and State of Wisconsin.

WILLIAM H. SAECK.